US011302361B2

(12) United States Patent
Phillips et al.

(10) Patent No.: US 11,302,361 B2
(45) Date of Patent: Apr. 12, 2022

(54) APPARATUS FOR VIDEO SEARCHING USING MULTI-MODAL CRITERIA AND METHOD THEREOF

(71) Applicant: SAMSUNG ELECTRONICS CO., LTD., Suwon-si (KR)

(72) Inventors: Caleb Phillips, Toronto (CA); Iqbal Mohomed, Toronto (CA); Afsaneh Fazly, Toronto (CA); Allan Jepson, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/725,609

(22) Filed: Dec. 23, 2019

(65) Prior Publication Data
US 2021/0193187 A1  Jun. 24, 2021

(51) Int. Cl.
*G11B 27/19* (2006.01)
*G06K 9/00* (2006.01)
*G06F 16/735* (2019.01)
*G06F 16/783* (2019.01)

(52) U.S. Cl.
CPC ............ *G11B 27/19* (2013.01); *G06F 16/735* (2019.01); *G06F 16/7844* (2019.01); *G06K 9/00718* (2013.01); *G06K 9/00765* (2013.01); *G06K 2209/01* (2013.01)

(58) Field of Classification Search
CPC ... G11B 27/19; G06F 16/7844; G06F 16/735; G06K 9/00718; G06K 9/00765; G06K 2209/01
USPC ....................................................... 386/241
See application file for complete search history.

(56) References Cited

U.S. PATENT DOCUMENTS

| 9,639,761 | B2 | 5/2017 | Mansour et al. |
| 10,198,509 | B2 | 2/2019 | Cheng et al. |
| 2004/0117367 | A1 | 6/2004 | Smith et al. |
| 2004/0207656 | A1 | 10/2004 | Lee et al. |
| 2011/0202527 | A1 | 8/2011 | McCloskey et al. |

(Continued)

FOREIGN PATENT DOCUMENTS

KR    10-0547370 B1    1/2006

OTHER PUBLICATIONS

International Search Report and Written Opinion dated Sep. 15, 2020 by the International Searching Authority in counterpart International patent Application No. PCT/KR202/003316. (PCT/ISA/210/220/237).

*Primary Examiner* — Thai Q Tran
*Assistant Examiner* — Nienru Yang
(74) *Attorney, Agent, or Firm* — Sughrue Mion, PLLC

(57) ABSTRACT

An apparatus for video searching, includes a memory storing instructions, and a processor configured to execute the instructions to split a video into scenes, obtain, from the scenes into which the video is split, one or more textual descriptors describing each of the scenes, encode the obtained one or more textual descriptors describing each of the scenes into a video scene vector of each of the scenes, encode a user query into a query vector having a same semantic representation as that of the video scene vector of each of the scenes into which the one or more textual descriptors describing each of the scenes are encoded, and identify whether the video scene vector of at least one among the scenes corresponds to the query vector into which the user query is encoded.

20 Claims, 13 Drawing Sheets

(56) References Cited

U.S. PATENT DOCUMENTS

| | | | |
|---|---|---|---|
| 2013/0166303 A1* | 6/2013 | Chang | G06F 16/7834 |
| | | | 704/258 |
| 2014/0363138 A1 | 12/2014 | Coviello et al. | |
| 2015/0254513 A1 | 9/2015 | Mansour et al. | |
| 2016/0239521 A1 | 8/2016 | Park et al. | |
| 2016/0342842 A1* | 11/2016 | Dunlop | G06T 7/174 |
| 2017/0083623 A1 | 3/2017 | Habibian et al. | |
| 2017/0357720 A1 | 12/2017 | Torabi et al. | |
| 2018/0053057 A1 | 2/2018 | De Souza et al. | |
| 2018/0089593 A1* | 3/2018 | Patel | G06N 20/00 |
| 2018/0293246 A1 | 10/2018 | Wang et al. | |
| 2018/0293313 A1* | 10/2018 | Hauptmann | G06F 16/78 |
| 2019/0171660 A1* | 6/2019 | Kershaw | G06F 16/34 |

\* cited by examiner

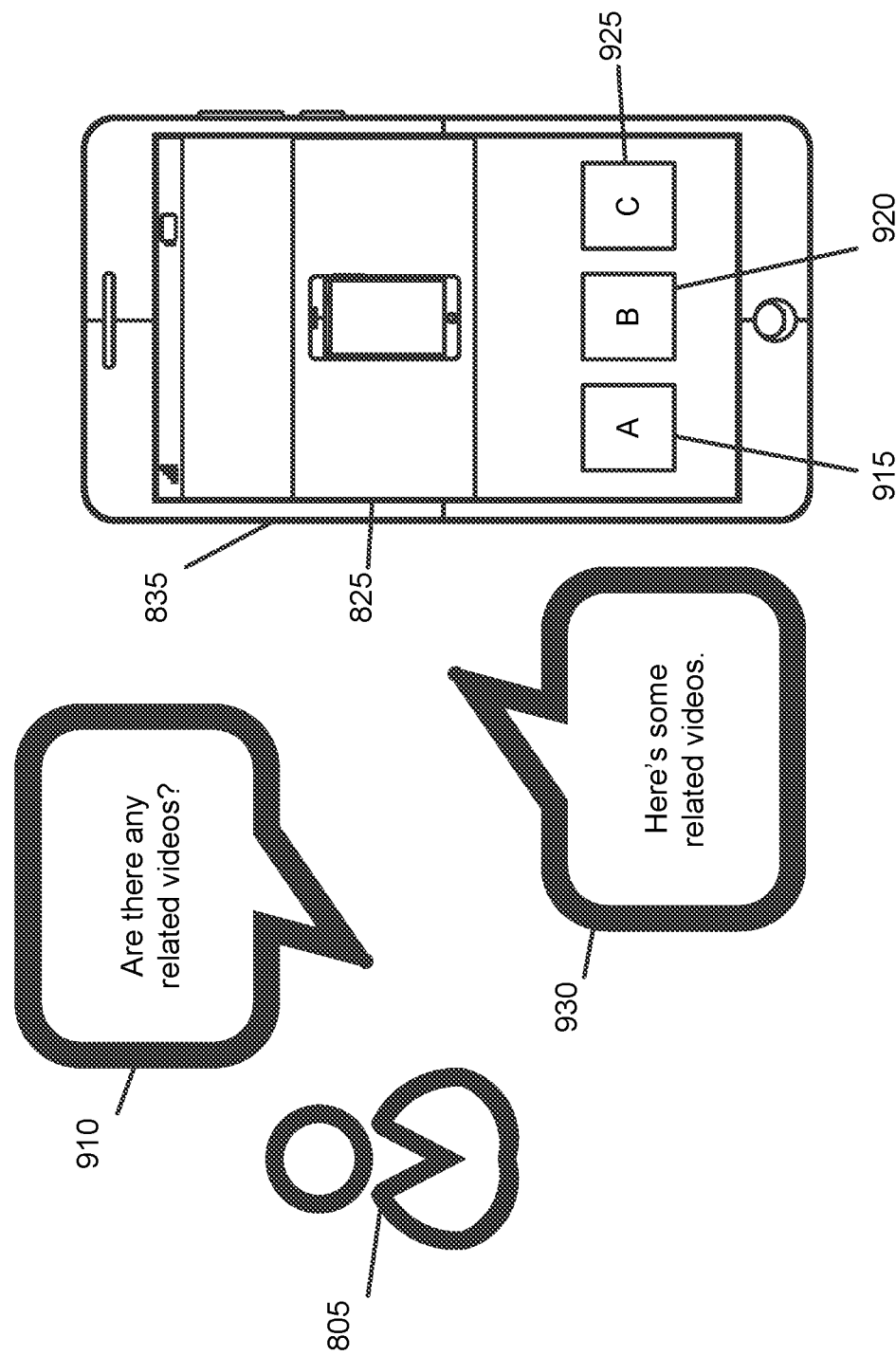

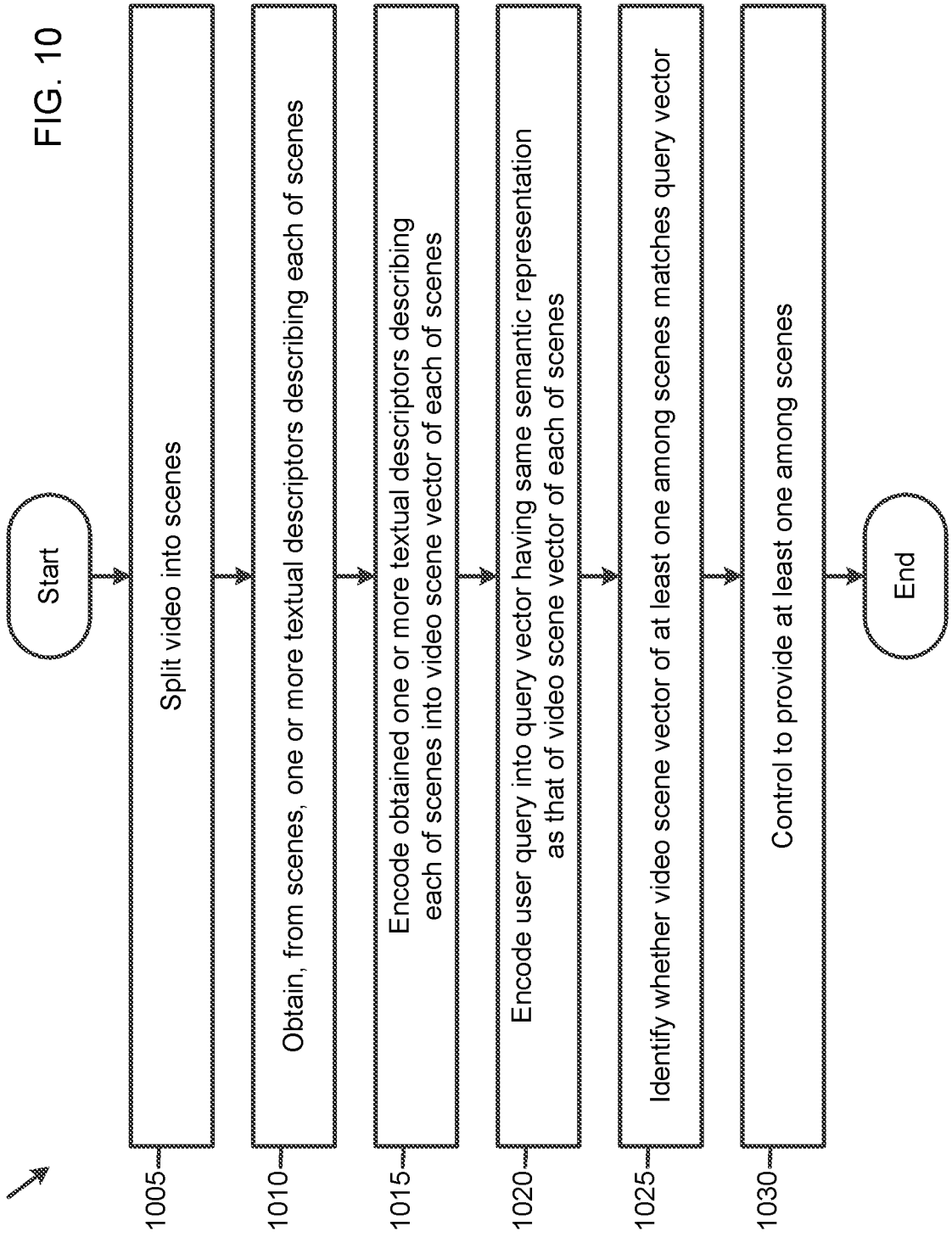

APPARATUS FOR VIDEO SEARCHING USING MULTI-MODAL CRITERIA AND METHOD THEREOF

BACKGROUND

1. Field

The disclosure relates to video searching, and more particularly, to an apparatus for video searching using multi-modal criteria and a method thereof.

2. Description of Related Art

With the abundance of video content on the Internet, a user may have a difficult time finding a right portion or segment of a video in response to a question he or she might have. Often a user may end up watching several videos that are retrieved in response to a query, before actually finding a right portion of one of the videos that answers the query.

SUMMARY

According to embodiments, an apparatus for video searching, includes a memory storing instructions, and a processor configured to execute the instructions to split a video into scenes, obtain, from the scenes into which the video is split, one or more textual descriptors describing each of the scenes, encode the obtained one or more textual descriptors describing each of the scenes into a video scene vector of each of the scenes, encode a user query into a query vector having a same semantic representation as that of the video scene vector of each of the scenes into which the one or more textual descriptors describing each of the scenes are encoded, identify whether the video scene vector of at least one among the scenes corresponds to the query vector into which the user query is encoded, and based on the video scene vector of the at least one among the scenes being identified to correspond to the query vector, control to provide the at least one among the scenes.

The processor may be further configured to execute the instructions to, based on the video scene vector of each of the scenes being identified to not correspond to the query vector, split the query vector into query subsets, each of the query subsets corresponding to a different part of the user query, encode the query subsets into query subset vectors, each of the query subset vectors having the same semantic representation as that of the video scene vector of each of the scenes, identify whether the video scene vector of one or more of the scenes corresponds to at least one among the query subset vectors, and based on the video scene vector of the one or more of the scenes being identified to correspond to the at least one among the query subset vectors, control to provide the one or more of the scenes.

The one or more textual descriptors describing each of the scenes may be obtained from the scenes, by performing object detection, action recognition, object character recognition, pose detection and audio detection on the scenes, using deep neural networks.

The obtained one or more textual descriptors may be encoded into the video scene vector of each of the scenes, using a Universal Sentence Encoder, and the user query is encoded into the query vector, using the Universal Sentence Encoder.

The processor may be further configured to execute the instructions to obtain captions from the video, and encode the obtained captions and the obtained one or more textual descriptors describing each of the scenes into the video scene vector of each of the scenes, using the Universal Sentence Encoder.

The processor may be further configured to execute the instructions to obtain a vector score of each of the scenes, based on a similarity between the query vector and each of the video scene vectors, based on the obtained vector score of the at least one among the scenes being greater than a predetermined threshold, identify that the video scene vector of the at least one among the scenes corresponds to the query vector, and rank the at least one among the scenes of which the video scene vector is identified to correspond to the query vector, based on the obtained vector score of the at least one among the scenes.

The video scene vectors of each of the scenes may include vector types including an action, an object and a caption, and the processor may be further configured to execute the instructions to obtain vector type weights to be respectively applied based on the vector types, based on the user query, and adjust the obtained vector score of each of the scenes, based on the obtained vector type weights.

According to embodiments, a method of video searching, includes splitting a video into scenes, obtaining, from the scenes into which the video is split, one or more textual descriptors describing each of the scenes, encoding the obtained one or more textual descriptors describing each of the scenes into a video scene vector of each of the scenes, encoding a user query into a query vector having a same semantic representation as that of the video scene vector of each of the scenes into which the one or more textual descriptors describing each of the scenes are encoded, identifying whether the video scene vector of at least one among the scenes corresponds to the query vector into which the user query is encoded, and based on the video scene vector of the at least one among the scenes being identified to correspond to the query vector, controlling to provide the at least one among the scenes.

The method may further include, based on the video scene vector of each of the scenes being identified to not correspond to the query vector, splitting the query vector into query subsets, each of the query subsets corresponding to a different part of the user query, encoding the query subsets into query subset vectors, each of the query subset vectors having the same semantic representation as that of the video scene vector of each of the scenes, identifying whether the video scene vector of one or more of the scenes corresponds to at least one among the query subset vectors, and based on the video scene vector of the one or more of the scenes being identified to correspond to the at least one among the query subset vectors, controlling to provide the one or more of the scenes.

The one or more textual descriptors describing each of the scenes may be obtained from the scenes, by performing object detection, action recognition, object character recognition, pose detection and audio detection on the scenes, using deep neural networks.

The obtained one or more textual descriptors may be encoded into the video scene vector of each of the scenes, using a Universal Sentence Encoder, and the user query may be encoded into the query vector, using the Universal Sentence Encoder.

The method may further include obtaining captions from the video, and encoding the obtained captions and the obtained one or more textual descriptors describing each of the scenes into the video scene vector of each of the scenes, using the Universal Sentence Encoder.

The method may further include obtaining a vector score of each of the scenes, based on a similarity between the query vector and each of the video scene vectors, based on the obtained vector score of the at least one among the scenes being greater than a predetermined threshold, identifying that the video scene vector of the at least one among the scenes corresponds to the query vector, and ranking the at least one among the scenes of which the video scene vector is identified to correspond to the query vector, based on the obtained vector score of the at least one among the scenes.

The video scene vectors of each of the scenes may include vector types including an action, an object and a caption, and the method may further include obtaining vector type weights to be respectively applied based on the vector types, based on the user query, and adjusting the obtained vector score of each of the scenes, based on the obtained vector type weights.

According to embodiments, a non-transitory computer-readable storage medium stores instructions configured to cause a processor to split a video into scenes, obtain, from the scenes into which the video is split, one or more textual descriptors describing each of the scenes, encode the obtained one or more textual descriptors describing each of the scenes into a video scene vector of each of the scenes, encode a user query into a query vector having a same semantic representation as that of the video scene vector of each of the scenes into which the one or more textual descriptors describing each of the scenes are encoded, identify whether the video scene vector of at least one among the scenes corresponds to the query vector into which the user query is encoded, and based on the video scene vector of the at least one among the scenes being identified to correspond to the query vector, control to provide the at least one among the scenes.

The instructions may be further configured to cause the processor to, based on the video scene vector of each of the scenes being identified to not correspond to the query vector, split the query vector into query subsets, each of the query subsets corresponding to a different part of the user query, encode the query subsets into query subset vectors, each of the query subset vectors having the same semantic representation as that of the video scene vector of each of the scenes, identify whether the video scene vector of one or more of the scenes corresponds to at least one among the query subset vectors, and based on the video scene vector of the one or more of the scenes being identified to correspond to the at least one among the query subset vectors, control to provide the one or more of the scenes.

The one or more textual descriptors describing each of the scenes may be obtained from the scenes, by performing object detection, action recognition, object character recognition, pose detection and audio detection on the scenes, using deep neural networks.

The obtained one or more textual descriptors may be encoded into the video scene vector of each of the scenes, using a Universal Sentence Encoder, and the user query is encoded into the query vector, using the Universal Sentence Encoder.

The instructions may be further configured to cause the processor to obtain captions from the video, and encode the obtained captions and the obtained one or more textual descriptors describing each of the scenes into the video scene vector of each of the scenes, using the Universal Sentence Encoder.

The instructions may be further configured to cause the processor to obtain a vector score of each of the scenes, based on a similarity between the query vector and each of the video scene vectors, based on the obtained vector score of the at least one among the scenes being greater than a predetermined threshold, identify that the video scene vector of the at least one among the scenes corresponds to the query vector, and rank the at least one among the scenes of which the video scene vector is identified to correspond to the query vector, based on the obtained vector score of the at least one among the scenes.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects and features of embodiments of the disclosure will be more apparent from the following description taken in conjunction with the accompanying drawings, in which:

FIG. 9B is a diagram of another example of a method of using an apparatus for video searching, according to embodiments;

FIG. 10 is a flowchart of a method of video searching, according to embodiments.

DETAILED DESCRIPTION

Figure 1:
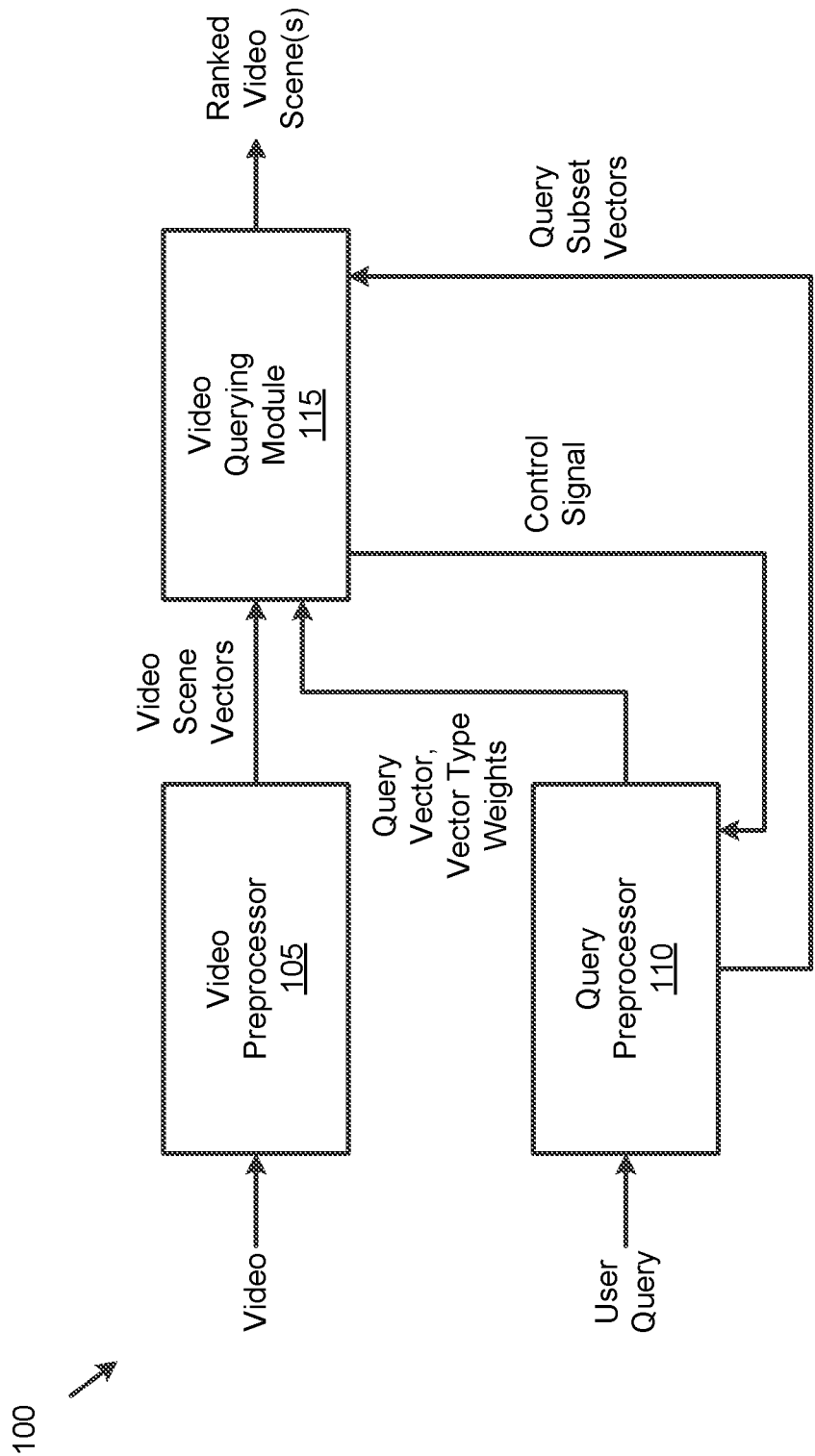
FIG. 1 is a block diagram of an apparatus for video searching, according to embodiments.

Embodiments of the disclosure provide an apparatus for video searching using multi-modal criteria and a method thereof. The apparatus can find a relevant segment of a video in response to a user query including a textual or spoken utterance of a user, resulting in an enhanced user experience. The apparatus may also provide a convenient application program interface (API) for applications needing video-based search so that the applications may quickly leverage extraction and search features of the apparatus.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, a deep neural network (DNN) is a representative example of an artificial neural network model simulating brain nerves, and is not limited to an artificial neural network model using an algorithm.

Throughout the disclosure, the expression "at least one of a, b or c" indicates only a, only b, only c, both a and b, both a and c, both b and c, all of a, b, and c, or variations thereof.

FIG. 1 is a block diagram of an apparatus 100 for video searching, according to embodiments.

As shown in FIG. 1, the apparatus 100 for video searching includes a video preprocessor 105, a query preprocessor 110 and a video querying module 115.

As will be described later with reference to FIG. 2, the video preprocessor 105 obtains a video, and obtains video scene vectors based on the obtained video. The video may include any type of video, such as, for example, user-uploaded videos and online videos. The video scene vectors may include video scenes (i.e., sequences of successive frames) that are segmented from the obtained video. The video scene vectors may further include vectors that are aligned with the video scenes, and vector types of the vectors. The vectors are semantic representations of the video scenes. A vector type may be, for example, an action, an object, or a caption that describes what a corresponding vector is representing in a video scene. For example, a first video scene vector may include a first video scene with a first vector "burger" and a first vector type "object," and a second video scene vector may include a second video scene with a second vector "fry the onions" and a second vector type "caption."

As will be described later with reference to FIG. 6, the query preprocessor 110 obtains a user query, and obtains a query vector and vector type weights based on the obtained user query. The user query may be a textual or spoken utterance of a user. In embodiments, the user query may be an image or video content that is selected by the user. The query vector is a semantic representation of the obtained user query, and the vector type weights are to be respectively applied based on the different vector types of the vectors included in the video scene vectors described above. The semantic representation of the query vector is the same (or in the same space) as those of the video scene vectors to allow for more accurate and quicker comparison and matching between the query vector and each of the video scene vectors.

Further, the query preprocessor 110 may obtain a control signal from the video querying module 115. Based on the control signal being obtained because the user query did not produce any matching video scenes, the query preprocessor 110 may split the query vector into query subset vectors that are subsets of the query vector and are compared to the video scene vectors to find a matching video scene.

The video and user query may be obtained from a data storage medium including a magnetic medium such as a hard disk, a floppy disk, or a magnetic tape, an optical recording medium such as CD-ROM or DVD, or a magneto-optical medium such as a floptical disk. The video and user query may also be directly obtained from the Internet and an input interface including, for example, a camera and a microphone, based on a user input.

As will be described later with reference to FIG. 7, the video querying module 115 obtains the video scene vectors from the video preprocessor 105, obtains the query vector and vector type weights from the query preprocessor 110, and compares the obtained query vector to each of the obtained video scene vectors to determine if there is a match between the obtained query vector and any of the obtained video scene vectors. That is, the video querying module 115 scores and ranks the videos scenes, based on a similarity between the obtained query vector and each of the obtained video scene vectors. Based on the similarity between the obtained query vector and at least one among the obtained video scene vectors being greater than a predetermined threshold (i.e., a similar video scene being found), the video querying module 115 outputs and ranks at least one among the video scenes that corresponds to the at least one among the obtained video scene vectors. Based on the similarity between the obtained query vector and none among the obtained video scene vectors being greater than the predetermined threshold (i.e., no similar video scenes being found), the video querying module 115 outputs the control signal to the query preprocessor 110 so that the query preprocessor 110 splits the query vector into the query subset vectors.

The video preprocessor 105, the query preprocessor 110 and the video querying module 115 according to embodiments are described as individual devices, but may be implemented through one processor. In this case, the video preprocessor 105, the query preprocessor 110 and the video querying module 115 may be implemented through a dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the video preprocessor 105, the query preprocessor 110 and the video querying module 115 may be configured by a plurality of processors. In this case, the video preprocessor 105, the query preprocessor 110 and the video querying module 115 may be implemented through a combination of dedicated processors or through a combination of software and general-purpose processors such as AP, CPU or GPU.

According to embodiments, the apparatus 100 includes a CPU, a memory, and a computer program including instructions. The computer program is stored in the memory. According to embodiments, the apparatus 100 performs functions to be described with reference to FIG. 1 according to execution of the computer program by the CPU. According to embodiments, the functions to be described with reference to FIG. 1 are performed by a dedicated hardware chip and/or the CPU.

Figure 2:
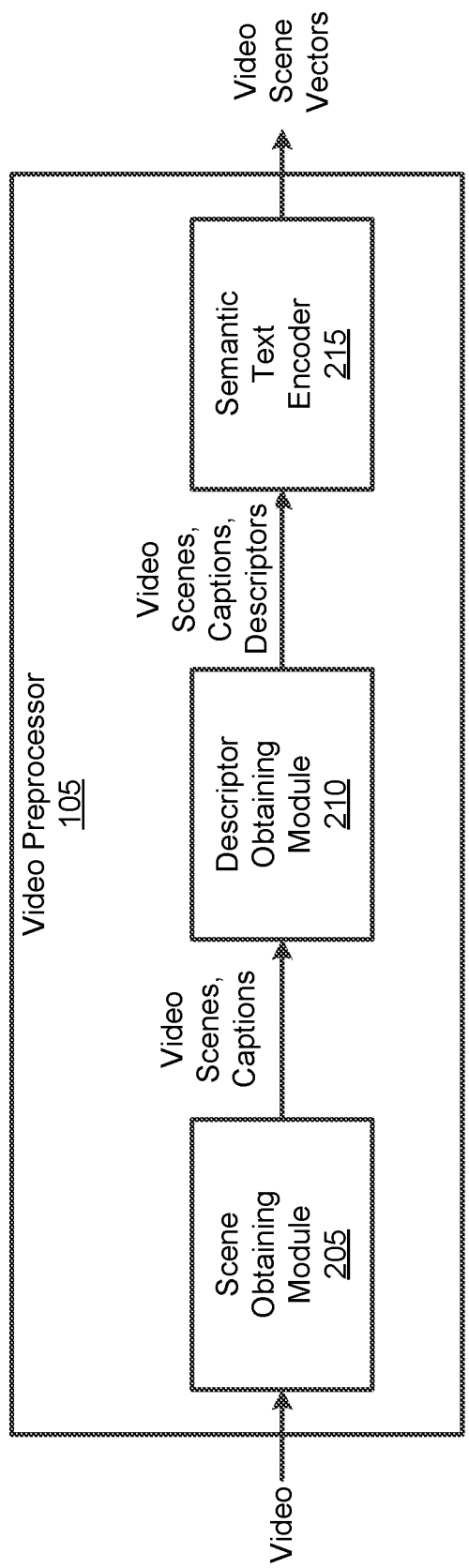
FIG. 2 is a block diagram of a video preprocessor of the apparatus for video searching shown in FIG. 1.

FIG. 2 is a block diagram of the video preprocessor 105 of the apparatus 100 for video searching shown in FIG. 1.

As shown in FIG. 2, the video preprocessor 105 includes a scene obtaining module 205, a descriptor obtaining module 210 and a semantic text encoder 215.

As will be described later with reference to FIG. 3, the scene obtaining module 205 obtains the video, and obtains the video scenes segmented from the obtained video along with captions that are recognized from the obtained video. Captions may be texts of spoken parts of the obtained video.

As will be described later with reference to FIG. 4, the descriptor obtaining module 210 obtains the video scenes and captions, and obtains descriptors that are category labels (i.e., textual or linguistic words or phrases) respectively describing or annotating the obtained video scenes.

As will be described later with reference to FIG. 5, the semantic text encoder 215 obtains the video scenes, captions and descriptors, and obtains the video scene vectors, based on the obtained video scenes, captions and descriptors.

Figure 3:
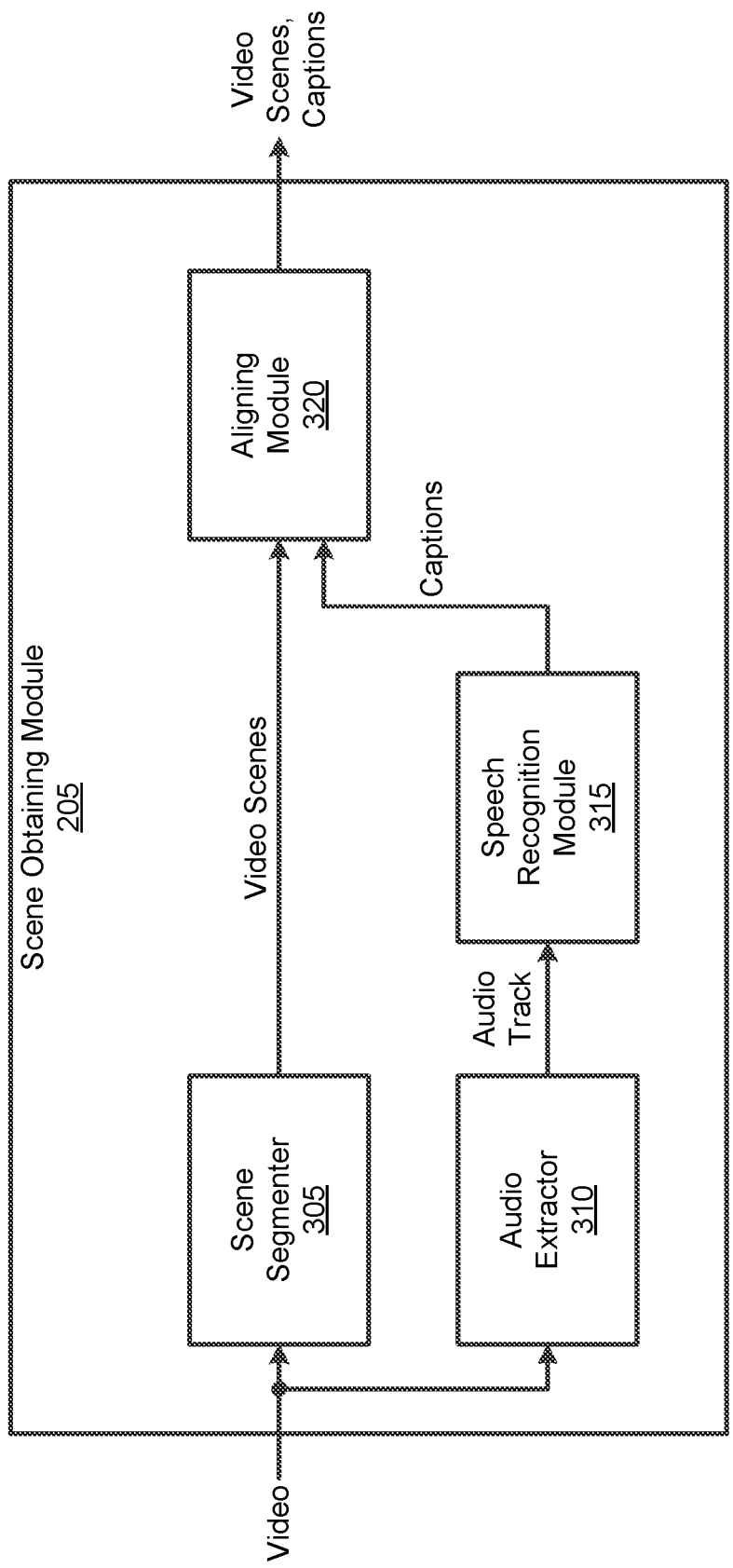
FIG. 3 is a block diagram of a scene obtaining module of the video preprocessor shown in FIG. 2.

FIG. 3 is a block diagram of the scene obtaining module 205 of the video preprocessor 105 shown in FIG. 2.

As shown in FIG. 3, the scene obtaining module 205 includes a scene segmenter 305, an audio extractor 310, a speech recognition module 315 and an aligning module 320.

The scene segmenter 305 obtains the video, and segments the obtained video into the video scenes. For example, the scene segmenter 305 may segment the obtained video into the logical video scenes, at a scene boundary or timepoint at which speech is silent between conversations. In another example, the scene segmenter 305 may segment the obtained video into the logical video scenes, at a scene boundary or timepoint of a scene change when speech is not available, e.g., a black transition, a camera wipe and the like.

The audio extractor 310 obtains the video, and extracts an audio track from the obtained video.

The speech recognition module 315 obtains the audio track, and recognizes the captions from the obtained audio track. The speech recognition module 315 further obtains timestamps of when the respective captions are recognized, and outputs the recognized captions along with the obtained timestamps.

The aligning module 320 obtains the video scenes and captions, and aligns the obtained video scenes with the obtained captions so that the obtained video scenes are respectively matched in time with the obtained captions. The obtained video scenes may be aligned with the obtained captions, using timestamps at which the video scenes and captions are respectively obtained.

Figure 4:
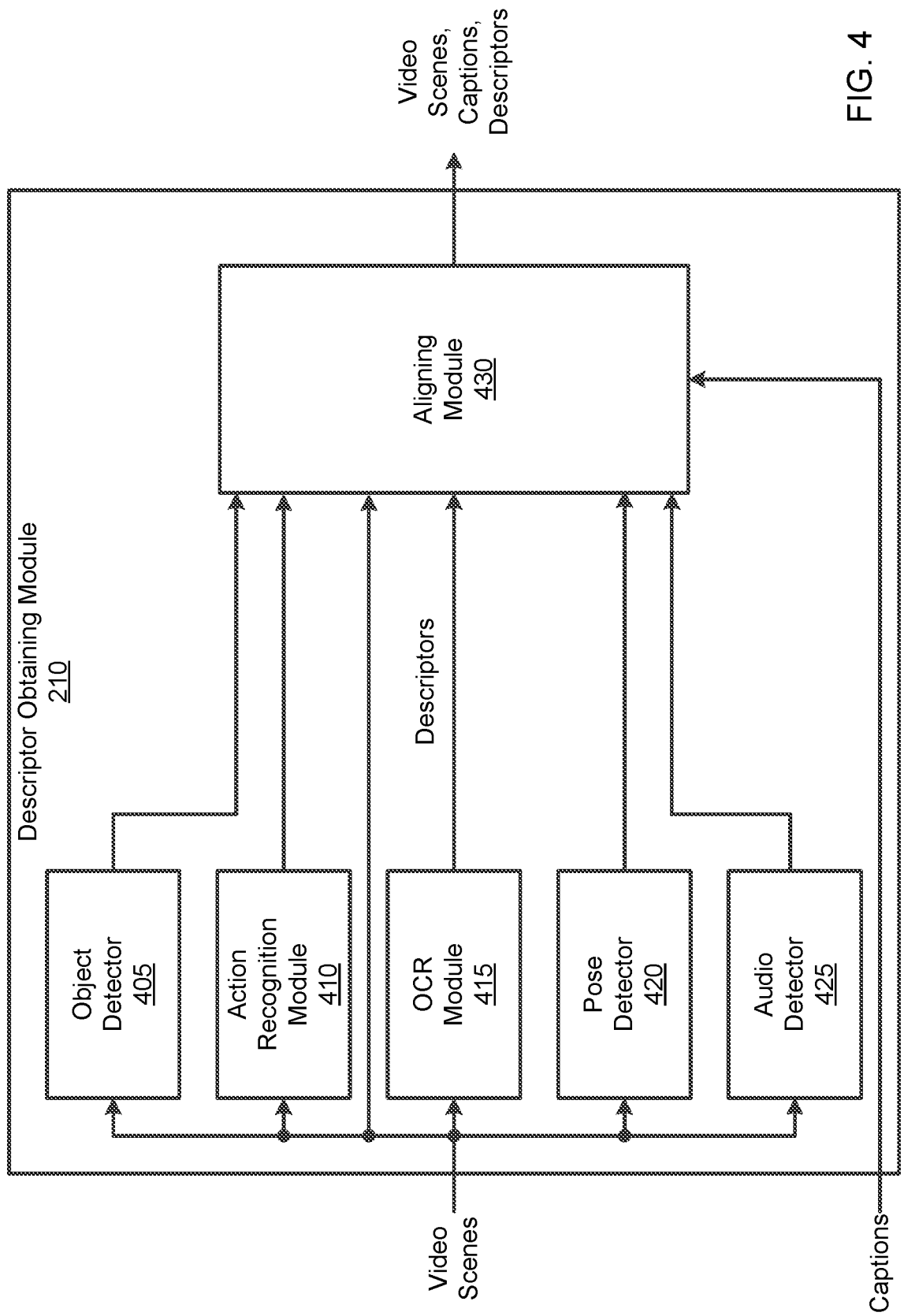
FIG. 4 is a block diagram of a descriptor obtaining module of the video preprocessor shown in FIG. 2.

FIG. 4 is a block diagram of the descriptor obtaining module 210 of the video preprocessor 105 shown in FIG. 2.

As shown in FIG. 4, the descriptor obtaining module 210 includes an object detector 405, an action recognition module 410, an object character recognition (OCR) module 415, a pose detector 420, an audio detector 425 and an aligning module 430.

Each of the object detector 405, the action recognition module 410, the OCR module 415, the pose detector 420, and the audio detector 425 obtains the video scenes from the scene obtaining module 205, and obtains the descriptors respectively describing the obtained video scenes. Each of the object detector 405, the action recognition module 410, the OCR module 415, the pose detector 420, and the audio detector 425 may include a deep neural network (DNN) that extracts visuo-linguistic content from the obtained video scenes.

The object detector 405 detects one or more objects from the obtained video scenes, and obtains one or more of the descriptors respectively describing the detected one or more objects. For example, the one or more of the descriptors may include object labels such as "screw" and "television stand."

The action recognition module 410 recognizes one or more actions of actors included in the obtained video scenes, and obtains one or more of the descriptors respectively describing the recognized one or more actions. For example, the one or more of the descriptors may include action labels such as "walking" and "lifting."

The OCR module 415 recognizes one or more textual characters or words included in the obtained video scenes, and obtains one or more of the descriptors respectively describing the recognized one or more textual characters or words. For example, the one or more of the descriptors may include onscreen text such as "step 1" and "welcome."

The pose detector 420 detects one or more poses of the actors, from the obtained video scenes, and obtains one or more of the descriptors respectively describing the detected one or more poses. The one or more poses may include, for example, a hand or face of an actor. For example, the one or more of the descriptors may include pose labels such as "head," "left hand" and "gripping."

The audio detector 425 detects audio from the obtained video scenes, and obtains one or more of the descriptors respectively describing the detected audio. For example, the one or more of the descriptors may include audio events such as "hammering," "sirens" and "dialogue."

The aligning module 430 obtains the video scenes aligned with the captions and the descriptors, and aligns the obtained video scenes with the captions and the obtained descriptors so that the obtained video scenes are respectively matched in time with the captions and the obtained descriptors. The obtained video scenes may be aligned with the captions and the obtained descriptors, using timestamps at which the video scenes, captions and descriptors are respectively obtained.

Each of the object detector 405, the action recognition module 410, the OCR module 415, the pose detector 420, and the audio detector 425 may perform a corresponding function on a single frame of the obtained video scenes at a time.

Figure 5:
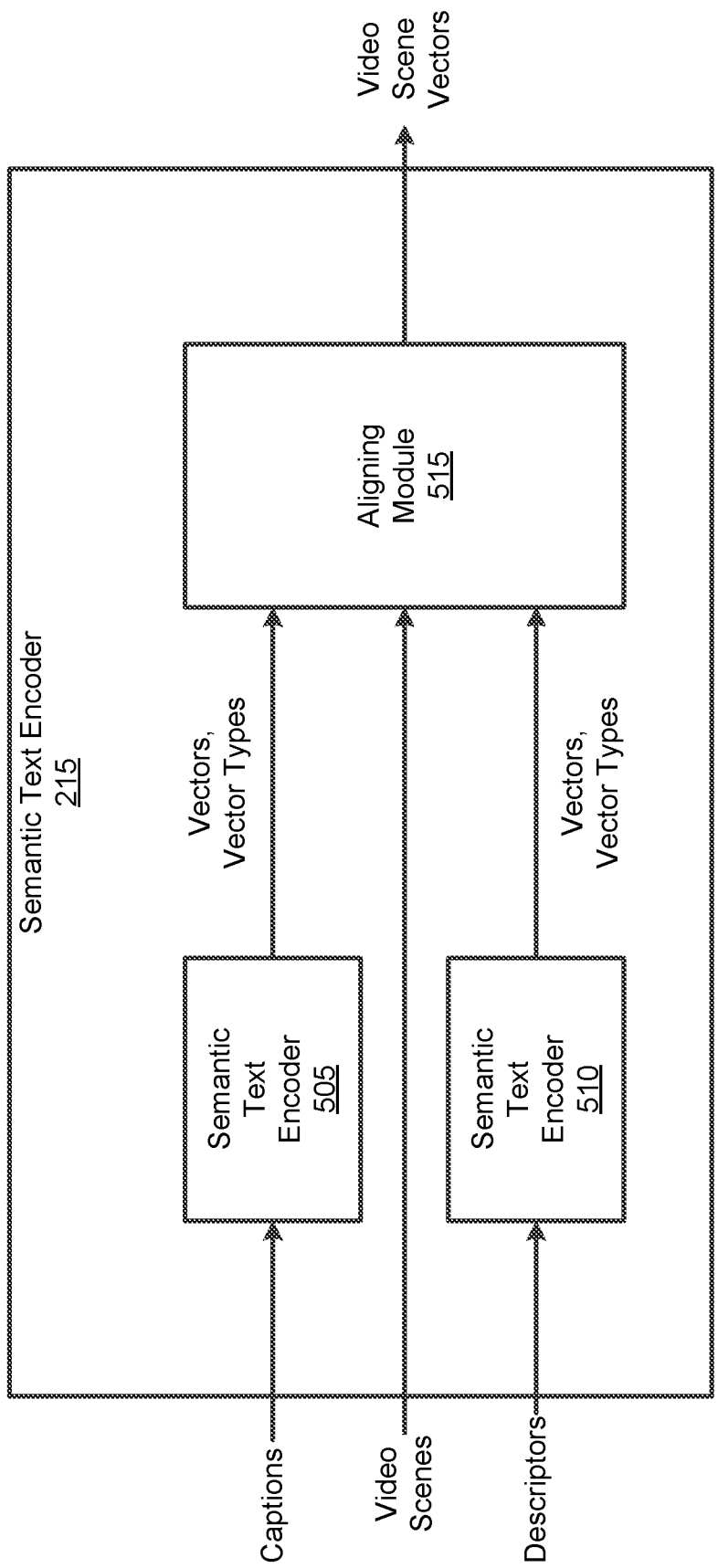
FIG. 5 is a block diagram of a semantic text encoder of the video preprocessor shown in FIG. 2.

FIG. 5 is a block diagram of the semantic text encoder 215 of the video preprocessor 105 shown in FIG. 2.

As shown in FIG. 5, the semantic text encoder 215 includes semantic text encoders 505 and 510 and an aligning module 515.

The semantic text encoder 505 obtains the captions from the descriptor obtaining module 210, and encodes the obtained captions into the vectors. The semantic text encoder 505 further obtains the vector types of the vectors.

The semantic text encoder 510 obtains the descriptors from the descriptor obtaining module 210, and encodes the obtained descriptors into the vectors. The semantic text encoder 510 further obtains the vector types of the vectors. The semantic text encoder 510 for the descriptors is separate from the semantic text encoder 505 for the captions because any of the captions may be spoken across multiple video scenes.

Each of the semantic text encoders 505 and 510 may be pre-trained, and may include the Universal Sentence Encoder or other sentence embedding methods. The Universal Sentence Encoder is a model for encoding sentences or word sequences into embedding vectors or semantic encodings. The Universal Sentence Encoder may be an instance of a general class of encoders called "sentence2vec."

The aligning module 515 obtains the video scenes, and the vectors and vector types from both of the semantic text encoders 505 and 510, and aligns the obtained video scenes with the obtained vector and vector types so that the obtained video scenes are respectively matched in time with the obtained vector and vector types. The video scenes aligned with the vector and vector types correspond to the video scene vectors. The obtained video scenes may be aligned with the obtained vector and vector types, using timestamps at which the video scenes, vectors and vector types are respectively obtained.

Figure 6:
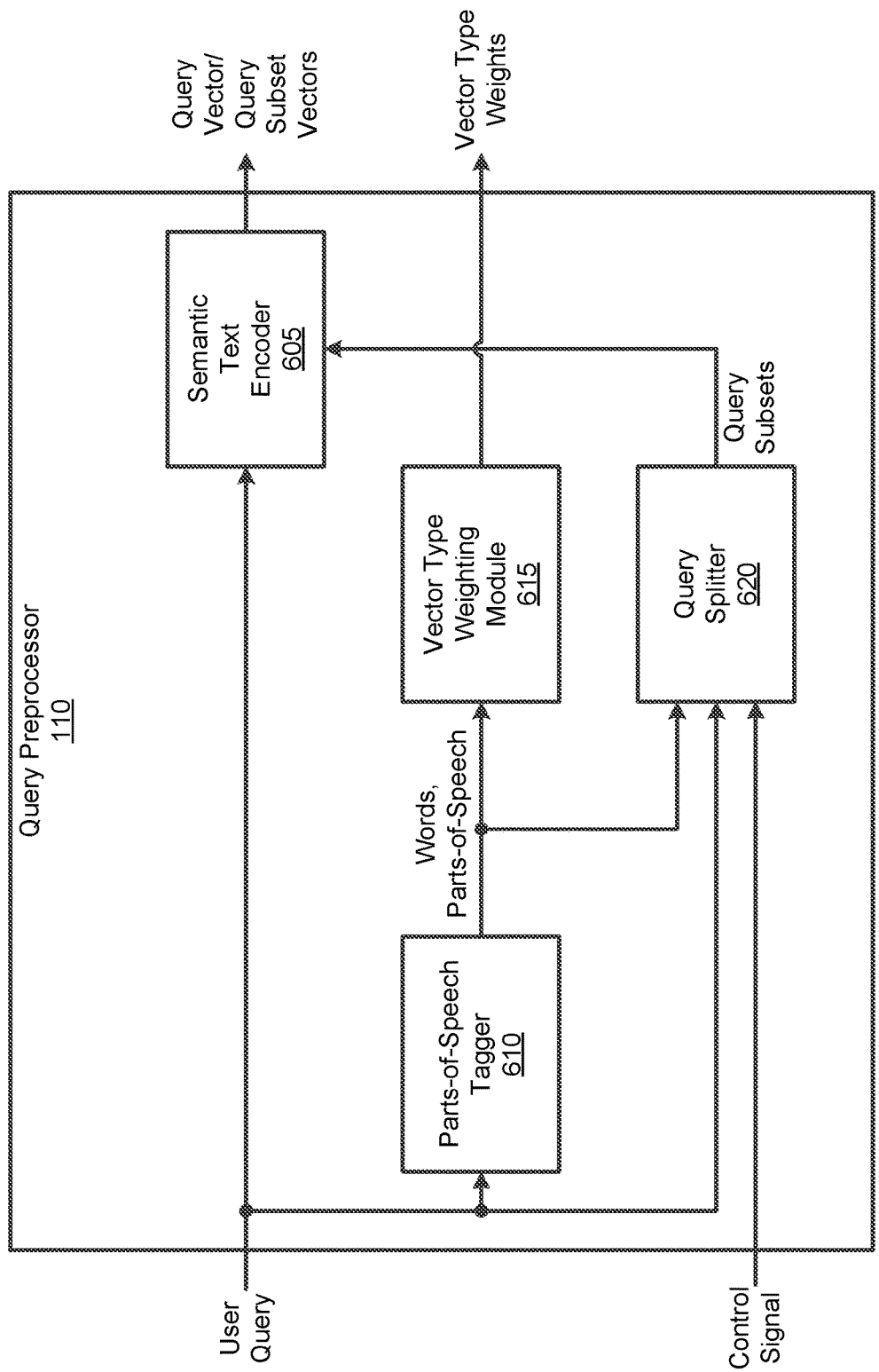
FIG. 6 is a block diagram of a query preprocessor of the apparatus for video searching shown in FIG. 1.

FIG. 6 is a block diagram of the query preprocessor 110 of the apparatus 100 for video searching shown in FIG. 1.

As shown in FIG. 6, the query preprocessor 110 includes a semantic text encoder 605, a parts-of-speech tagger 610, a vector type weighting module 615 and a query splitter 620.

The semantic text encoder 605 obtains the user query, and encodes the obtained user query into the query vector. The semantic text encoder 605 may be pre-trained, and may include the Universal Sentence Encoder, like the semantic text encoders 505 and 510. As a result, the semantic representation of the query vector is the same (or in the same space) as those of the video scene vectors, and is without a specific phrasing of the user query, to allow for more accurate and quicker comparison and matching between the query vector and each of the video scene vectors.

The parts-of-speech tagger 610 obtains the user query, and tags words of the user query respectively with parts-of-speech tags. For example, a word "screw" may be tagged with a parts-of-speech tag "verb," a word "stand" may be tagged with a parts-of-speech tag "noun," and a word "OLED-TV" may be tagged with the parts-of-speech tag "noun."

The vector type weighting module 615 obtains the words tagged with the parts-of-speech tags, and obtains vector type weights, based on the obtained words tagged with the parts-of-speech tags. As discussed above, the vector type weights are to be respectively applied based on the different vector types (e.g., the action, the object and the caption) of the vectors included in the obtained video scene vectors. In an example, as more of the words of the user query are tagged with the parts-of-speech tag "noun," a vector type weight to be applied to the vector type "object" may increase in value. In another example, as more of the words of the user query are tagged with the parts-of-speech tag "verb," a vector type weight to be applied to the vector type "action" may increase in value. In still another example, if a number of the words included in the user query exceeds a predetermined threshold so that the user query is identified as complicated, a vector type weight to be applied to the vector type "caption" may increase in value.

By obtaining the vector type weights based on the words included in the user query, the apparatus 100 may identify an intent of the user query, i.e., whether a user is asking for an object, an activity, or a combination of these. This identified intent may then be used to improve video searching using the video scene vectors and query vector.

The query splitter 620 obtains the user query, the words tagged with the parts-of-speech tags from the parts-of-speech tagger 610, and the control signal from the video querying module 115. The query splitter 620, based on the control signal being obtained because the user query did not produce any matching video scenes, splits the obtained user query into query subsets, based on the obtained words tagged with the parts-of-speech tags. For example, based on the user query being "Show me the person chopping the onions," the words "person," "chopping" and "onions" may be respectively tagged with the parts-of-speech tags "noun," "verb" and "noun." Based on the control signal being obtained because the user query did not produce any matching video scenes, the query splitter 620 may split the user query into a first query subset of "Person" and "chopping" (i.e., a noun-verb pair), a second query subset of "chopping" and "onions" (i.e., a verb-noun pair) and a third query subset of "person" and "onions" (i.e., a noun-noun pair). Based on the control signal being obtained again because the query subsets did not produce any matching video scenes, the query splitter 620 may further split the user query into a first query subset of "person," a second query subset of "chopping," and a third query subset of "onions."

The semantic text encoder 605 further obtains the query subsets from the query splitter 620, and encodes the obtained query subsets into query subset vectors that can be used similarly as the original query vector, for comparison and matching with the video scene vectors. Comparison and matching of the original query vector with the video scene vectors is a coarse search, while comparison and matching of the query subset vectors with the video scene vectors is a fine search.

Figure 7:
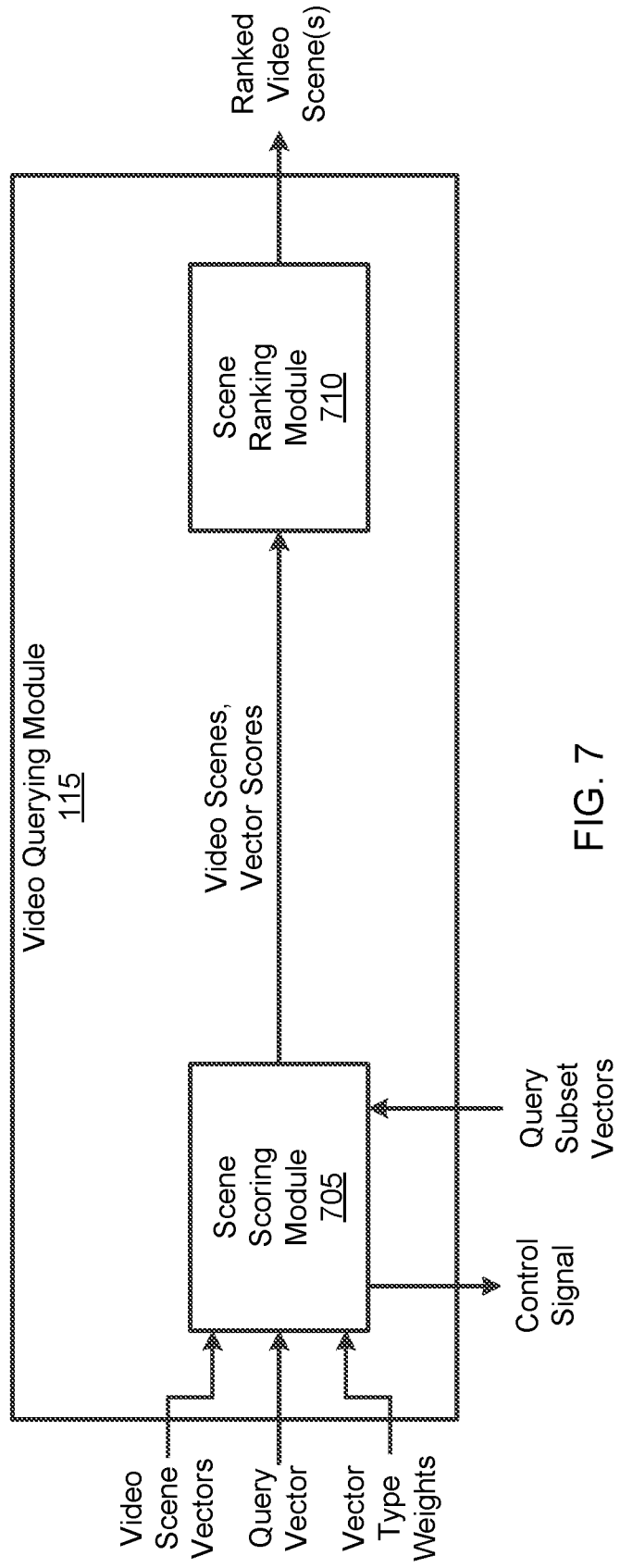
FIG. 7 is a block diagram of a video querying module of the apparatus for video searching shown in FIG. 1.

FIG. 7 is a block diagram of the video querying module 115 of the apparatus 100 for video searching shown in FIG. 1.

As shown in FIG. 7, the video querying module 115 includes a scene scoring module 705 and a scene ranking module 710.

The scene scoring module 705 obtains the video scene vectors from the video preprocessor 105, and obtains the query vector and the vector type weights from the query preprocessor 110. The scene scoring module 705 then obtains vector scores respectively for the video scenes, based on the similarity between the obtained query vector and each of the obtained video scene vectors. Such a similarity may include a Euclidean distance or cosine similarity.

The scene scoring module 705 may further adjust the obtained vector scores, based on the obtained vector type weights, e.g., multiply at least one among the obtained vector scores that corresponds to one of the vector types by the obtained vector type weights for the one of the vector types. For example, the vector type weight for the vector type "object" may be applied to vector scores corresponding to the vector type "object," the vector type weight for the vector type "action" may be applied to vector scores corresponding to the vector type "action," and the vector type weight for the vector type "caption" may be applied to vector scores corresponding to the vector type "caption." By adjusting the obtained vectors based on the obtained vector type weights, the scene scoring module 705 may more accurately and quickly find a video scene that best matches the user query.

Based on at least one among the obtained vector scores being greater than a predetermined threshold (i.e., a similar video scene being found), the scene scoring module 705 outputs at least one among the video scenes along with the corresponding at least one among the obtained vector scores. Based on none among the obtained vector scores being greater than the predetermined threshold (i.e., no similar video scenes being found), the scene scoring module 705 outputs the control signal to the query preprocessor 110 to control the query preprocessor 110 to split the query vector into the query subset vectors to recursively determine whether a similar video scene may be found using the query subset vectors. The predetermined threshold for the obtained vector scores may be pre-trained based on a user-desired amount of results, i.e., video scenes similar to a user query.

The scene ranking module 710 obtains the at least one among the video scenes along with the corresponding at least one among the obtained vector scores, and ranks the obtained at least one among the video scenes in an order from, e.g., highest-to-lowest vector scores. The scene ranking module 710 then outputs the ranked at least one among the video scenes to, e.g., a display for displaying any of the ranked at least one among the video scenes or a list of the ranked at least one among the video scenes. The display of the ranked at least one among the video scenes may serve as scene recommendations for a user that are sorted according to their relevance to the user query. In embodiments, the scene ranking module 710 may further output any one or any combination of the video scene vectors, the query vector, the video scenes, timestamps of the video scenes and the vector scores, to explain how the output at least one among the video scenes matches the user query.

Figure 8A:
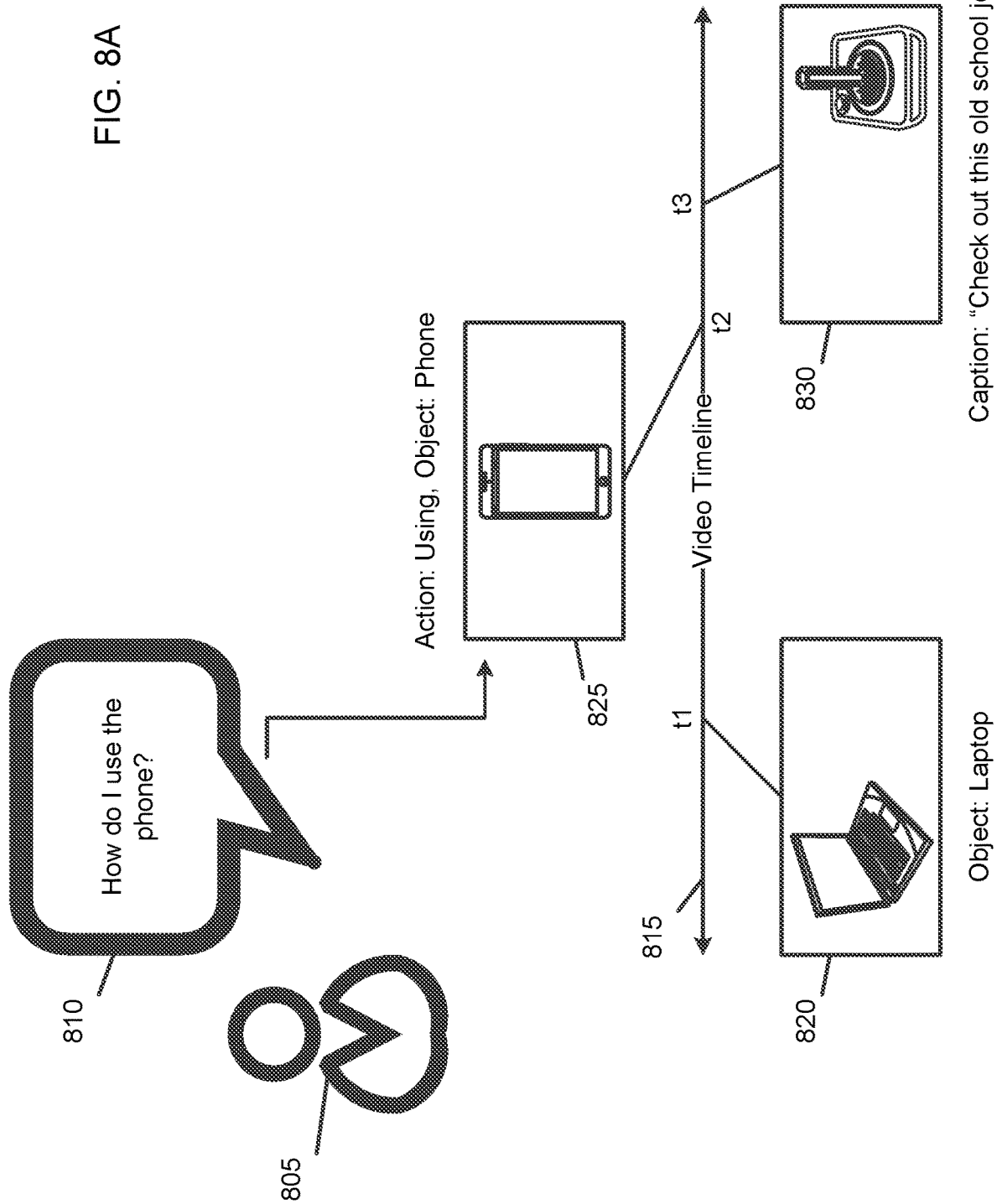
FIGS. 8A and 8B are diagrams of a method of using an apparatus for video searching, according to embodiments.
Figure 8B:
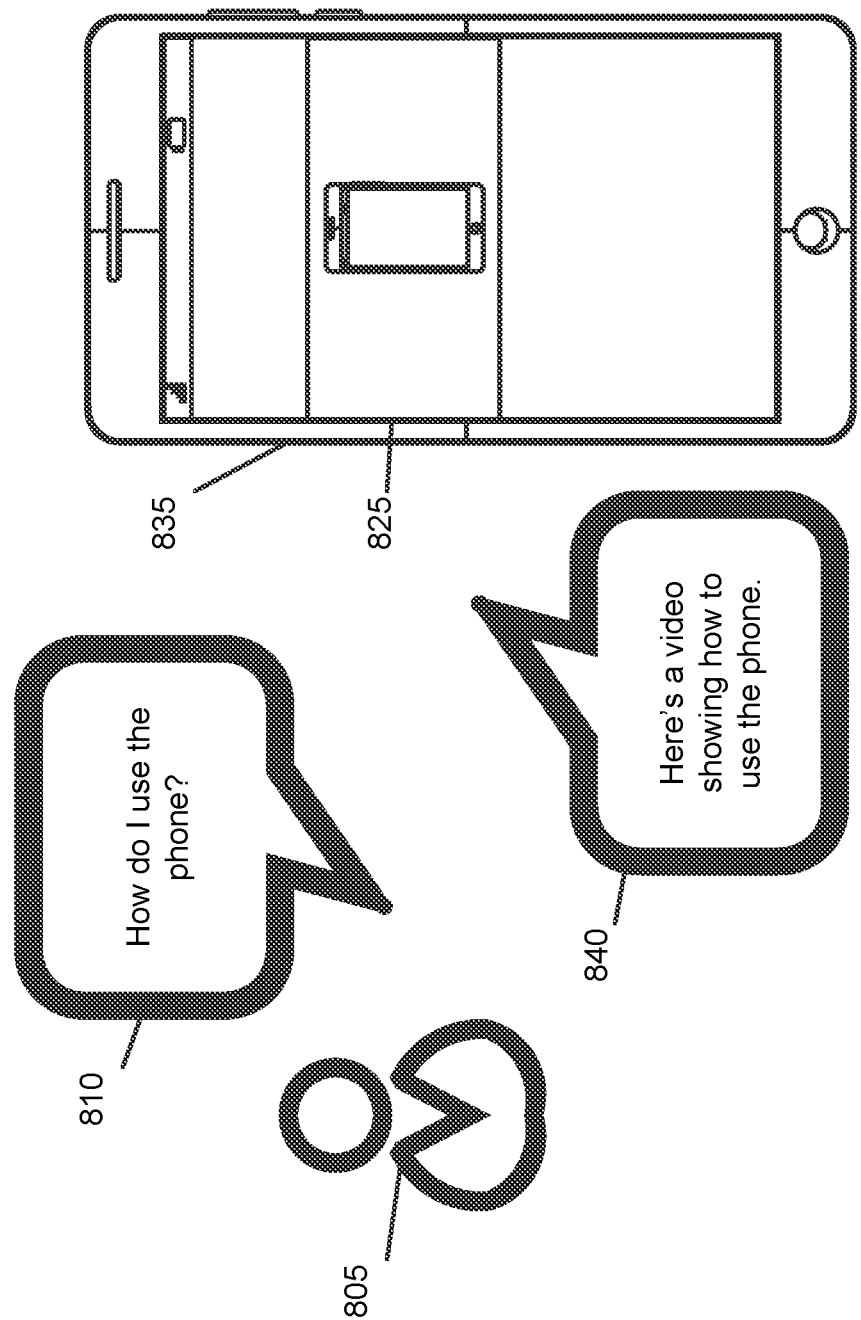

FIGS. 8A and 8B are diagrams of a method of using an apparatus for video searching, according to embodiments.

As shown in FIGS. 8A and 8B, a user 805 may utter a user query 810, such as "How do I use the phone?"

Referring to FIG. 8B, a smartphone 835 includes the apparatus 100 for video searching described in FIGS. 1-7. The smartphone 835 may obtain the user query 810, and may search for a video scene included in a video that may instruct the user 805 how to use the smartphone 835.

Referring again to FIG. 8A, the video may include a timeline 815 corresponding to video scenes included in the video. For example, timepoints t1, t2 and t3 of the timeline 815 may respectively correspond to video scenes 820, 825 and 830 having various vector types (e.g., an action, an object and a caption) and semantic vectors (e.g., "laptop," "using," "phone" and "Check out this old school joystick!"). The smartphone 835 may search the video, based on a semantic vector of the obtained user query 810, and may find that the semantic vector of the video scene 825 has a highest similarity to the semantic vector of the user query 810, among the video scenes.

Referring again to FIG. 8B, the smartphone 835 may display the found video scene 825 to the user 805 in response to the user query 810. Further, the smartphone 835 may audibly output a response message 840 such as "Here's a video showing how to use the phone." Accordingly, the smartphone 835 may provide a clear, informative and relevant answer to the user query 810.

In embodiments, other videos or scenes may be passively recommend to a user, based on a scene he or she is currently viewing. For example, the user may be currently viewing a video demonstrating a high-level concept such as machine learning applied to image recognition, in which a scene discusses the machine learning framework TensorFlow. Given a semantic vector recommendation of artifacts defining the TensorFlow scene (likely audio segments describing it), these vectors of this scene can be treated as a query and matched against other videos and scenes in a corpus using the same distance/similarity-based scoring mechanism explained above. So, while the user is watching the scene describing TensorFlow, highly-related videos that can explain the concept further may be suggested. Details of this method are described below.

Figure 9A:
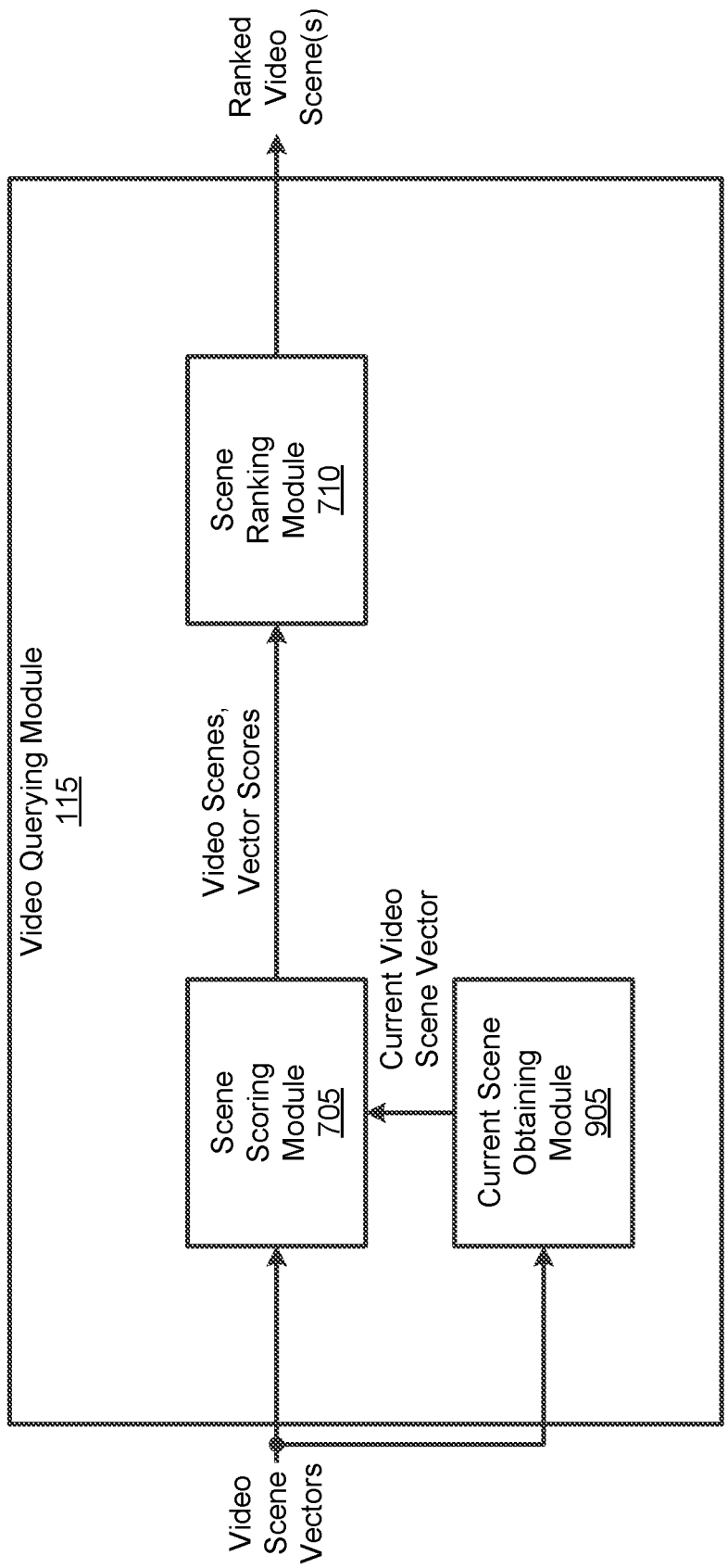
FIG. 9A is a block diagram of another example of a video querying module of the apparatus for video searching shown in FIG. 1.

FIG. 9A is a block diagram of another example of a video querying module of the apparatus for video searching shown in FIG. 1. FIG. 9B is a diagram of another example of a method of using an apparatus for video searching, according to embodiments.

As shown in FIG. 9A, the video querying module 115 includes a current scene obtaining module 905 along with the scene scoring module 705 and the scene ranking module 710 described with respect to FIG. 7.

The current scene obtaining module 905 obtains the video scene vectors from the video preprocessor 105, and then obtains, from the obtained video scene vectors, a current video scene vector corresponding to a current video scene that is being currently viewed and/or selected by a user. The current video scene vector may be obtained based on a user query to search for an initial video scene (the user query of FIG. 1) or for video scenes related to the initial video scene, such as, e.g., "Are there any related videos?" Further, the current video scene vector may correspond to one of the video scenes previously found using the user query of FIG. 1.

The scene scoring module 705 obtains the video scene vectors from the video preprocessor 105, and obtains the obtained current video scene vector from the current scene obtaining module 905. The scene scoring module 705 then obtains vector scores respectively for the video scenes, based on the similarity between the obtained current video scene vector and each of the obtained video scene vectors. Such a similarity may include a Euclidean distance or cosine similarity.

Based on at least one among the obtained vector scores being greater than a predetermined threshold (i.e., a similar video scene being found), the scene scoring module 705 outputs at least one among the video scenes along with the corresponding at least one among the obtained vector scores, as related video scenes related to the current video scene. The predetermined threshold for the obtained vector scores may be pre-trained based on a user-desired amount of results, i.e., video scenes similar to the current video scene.

Description of the scene ranking module 710 may be found with respect to FIG. 7, and will therefore be omitted herein.

Referring to FIG. 9B, the user 805 may utter a user query 910, such as "Are there any related videos?"

The smartphone 835 includes the apparatus 100 for video searching described in FIGS. 1-7 and 9A. The smartphone 835 may obtain the user query 910, and may search for video scenes related to the video scene 825 being currently viewed by the user 805 in a first portion of a screen of the smartphone 835. That is, the smartphone 835 may use the currently-viewed video scene 825 as a user query for searching for the related video scenes. The currently-viewed video scene 825 may correspond to the video scene 825 found using the user query 810 of FIGS. 8A and 8B.

The smartphone 835 may display, to the user 805 in a second portion of the screen, thumbnails of video scenes 915, 920 and 925 that are found to be related to the currently-viewed video scene 825, in response to the user query 910. These thumbnails of the video scenes 915, 920 and 925 may be displayed while the video scene 825 is being displayed, and may be selected by the user to display a corresponding one of the video scenes 915, 920 and 925 on the screen. The thumbnails of the video scenes 915, 920 and 925 may include preview images or videos of the video scenes 915, 920 and 925. Further, the smartphone 835 may audibly output a response message 930 such as "Here's some related videos."

FIG. 10 is a flowchart of a method 1000 of video searching, according to embodiments.

The method 1000 may be performed by the apparatus 100 for video searching as described in FIGS. 1-7.

Referring to FIG. 10, in operation 1005, the method 1000 includes splitting a video into scenes.

In operation 1010, the method 1000 includes obtaining, from the scenes into which the video is split, one or more textual descriptors describing each of the scenes.

In operation 1015, the method 1000 includes encoding the obtained one or more textual descriptors describing each of the scenes into a video scene vector of each of the scenes.

In operation 1020, the method 1000 includes encoding a user query into a query vector having a same semantic representation as that of the video scene vector of each of the scenes into which the one or more textual descriptors describing each of the scenes are encoded.

In operation 1025, the method 1000 includes identifying whether the video scene vector of at least one among the scenes matches the query vector into which the user query is encoded.

In operation 1030, the method 1000 includes, based on the video scene vector of the at least one among the scenes being identified to match the query vector, control to provide the at least one among the scenes.

Figure 11:
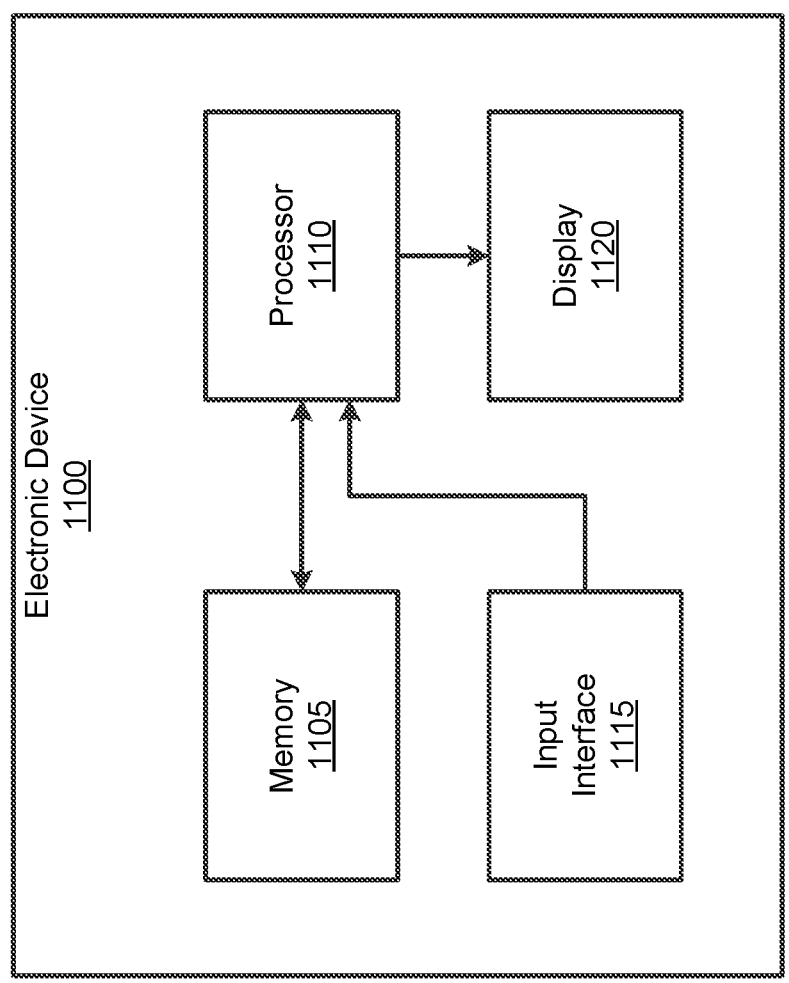
FIG. 11 is a block diagram of an electronic device implementing an apparatus for video searching, according to embodiments.

FIG. 11 is a block diagram of an electronic device 1100 implementing an apparatus for video searching, according to embodiments.

Referring to FIG. 11, the electronic device 1100 includes a memory 1105, a processor 1110, an input interface 1115 and a display 1120.

The electronic device 1100 may include any type of user device, such as, for example, a smartphone, a television and a smart appliance.

The memory 1110 takes overall control of the electronic device 1100. The memory 1110 may execute one or more programs that are stored in the memory 1105.

The memory 1105 may store various data, programs, and applications for driving and controlling the electronic device 1100. A program stored in the memory 1105 may include one or more instructions. A program (one or more instructions) or an application stored in the memory 1105 may be executed by the memory 1110.

The memory 1110 may perform any one or any combination of operations of the apparatus 100 for video searching, which is shown in FIGS. 1-7 and has been described with reference to FIGS. 1-7.

The input interface 1115 may receive a user input, such as, for example, an input for identifying a video to be searched and a user query for searching a video. The input interface 1115 may transmit the received user input to the memory 1110 to initiate the functions of the apparatus 100 for video searching. The input interface 1115 may include, for example, a camera, a microphone, a touchscreen, a keyboard, a mouse and the like.

The display 1120 may receive data such as, for example, an image of a matched video scene and a ranked list of video scenes, from the memory 1110, and may display the received data. The display 1120 may include, for example, a touchscreen, a computer monitor, a display panel, a smart television and the like.

The block diagram of the electronic device 1100 is provided as an example. Each component in the block diagram may be integrated, added, or omitted depending upon specifications of the electronic device 1100, which are actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN described above may be implemented via a software module. When the DNN model is implemented via a software module (for example, a program module including instructions), the DNN model may be stored in a computer-readable recording medium.

Also, the DNN model may be a part of the apparatus 100 for video searching described above by being integrated in a form of a hardware chip. For example, the DNN model may be manufactured in a form of a dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

By encoding textual descriptors of a user query and video scenes into a common vector space or common representation suitable for searching and finding conceptual similarity, using a common type of semantic text encoder for a sentence or text fragment, the apparatus for video searching according to the embodiments may provide a user the ability to quickly search across the textual descriptors for video scenes matching the user query.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for video searching, the apparatus comprising:
a memory storing instructions; and
a processor configured to execute the instructions to:
split a video into scenes;

obtain, from the scenes into which the video is split, one or more textual descriptors describing each of the scenes;

encode the obtained one or more textual descriptors describing each of the scenes into a video scene vector of each of the scenes;

encode a user query into a query vector having a same semantic representation as that of the video scene vector of each of the scenes into which the one or more textual descriptors describing each of the scenes are encoded;

identify whether the video scene vector of at least one among the scenes corresponds to the query vector into which the user query is encoded;

in response to the video scene vector of the at least one among the scenes being identified to correspond to the query vector, control to provide the at least one among the scenes;

in response to the video scene vector of each of the scenes being identified to not correspond to the query vector, split the user query into query subsets, each of the query subsets comprising a different part of the user query; and in response to the user query being split into the query subsets, encode the query subsets into query subset vectors, each of the query subset vectors having the same semantic representation as that of the video scene vector of each of the scenes;

identify whether the video scene vector of one or more of the scenes corresponds to at least one among the query subset vectors into which the query subsets are encoded; and in response to the video scene vector of the one or more of the scenes being identified to correspond to the at least one among the query subset vectors, control to provide the one or more of the scenes.

2. The apparatus of claim 1, wherein the one or more textual descriptors describing each of the scenes are obtained from the scenes, by performing object detection, action recognition, object character recognition, pose detection and audio detection on the scenes, using deep neural networks.

3. The apparatus of claim 1, wherein the obtained one or more textual descriptors are encoded into the video scene vector of each of the scenes, using a Universal Sentence Encoder; and the user query is encoded into the query vector, using the Universal Sentence Encoder.

4. The apparatus of claim 3, wherein the processor is further configured to execute the instructions to:

obtain captions from the video; and encode the obtained captions and the obtained one or more textual descriptors describing each of the scenes into the video scene vector of each of the scenes, using the Universal Sentence Encoder.

5. The apparatus of claim 1, wherein the processor is further configured to execute the instructions to:

obtain a vector score of each of the scenes, based on a similarity between the query vector and the video scene vector of each of the scenes;

in response to the obtained vector score of the at least one among the scenes being greater than a predetermined threshold, identify that the video scene vector of the at least one among the scenes corresponds to the query vector; and rank the at least one among the scenes of which the video scene vector is identified to correspond to the query vector, based on the obtained vector score of the at least one among the scenes.

6. The apparatus of claim 5, wherein the video scene vector of each of the scenes respectively has a vector type among vector types comprising an action, an object and a caption, and the processor is further configured to execute the instructions to:

obtain an amount of a part-of-speech included in the user query;

obtain a vector type weight corresponding to one among the vector types, the vector type weight being obtained based on the obtained amount of the part-of-speech; and apply the obtained vector type weight to at least one among the obtained vector score of each of the scenes, the at least one among the obtained vector score of each of the scenes corresponding to at least one among the video scene vector of each of the scenes having the one among the vector types.

7. The apparatus of claim 1, wherein the processor is further configured to execute the instructions to:

identify words of the user query that are tagged as nouns and verbs; and obtain the query subsets by pairing the identified words tagged as nouns and verbs.

8. A method of video searching, the method comprising:

splitting a video into scenes;

obtaining, from the scenes into which the video is split, one or more textual descriptors describing each of the scenes;

encoding the obtained one or more textual descriptors describing each of the scenes into a video scene vector of each of the scenes;

encoding a user query into a query vector having a same semantic representation as that of the video scene vector of each of the scenes into which the one or more textual descriptors describing each of the scenes are encoded;

identifying whether the video scene vector of at least one among the scenes corresponds to the query vector into which the user query is encoded;

in response to the video scene vector of the at least one among the scenes being identified to correspond to the query vector, controlling to provide the at least one among the scenes; and in response to the video scene vector of each of the scenes being identified to not correspond to the query vector, splitting the user query into query subsets, each of the query subsets comprising a different part of the user query;

in response to the user query being split into the query subsets, encoding the query subsets into query subset vectors, each of the query subset vectors having the same semantic representation as that of the video scene vector of each of the scenes;

identifying whether the video scene vector of one or more of the scenes corresponds to at least one among the query subset vectors into which the query subsets are encoded; and in response to the video scene vector of the one or more of the scenes being identified to correspond to the at least one among the query subset vectors, controlling to provide the one or more of the scenes.

9. The method of claim 8, wherein the one or more textual descriptors describing each of the scenes are obtained from the scenes, by performing object detection, action recognition, object character recognition, pose detection and audio detection on the scenes, using deep neural networks.

10. The method of claim 8, wherein the obtained one or more textual descriptors are encoded into the video scene vector of each of the scenes, using a Universal Sentence Encoder; and
the user query is encoded into the query vector, using the Universal Sentence Encoder.

11. The method of claim 10, further comprising:
obtaining captions from the video; and
encoding the obtained captions and the obtained one or more textual descriptors describing each of the scenes into the video scene vector of each of the scenes, using the Universal Sentence Encoder.

12. The method of claim 8, further comprising:
obtaining a vector score of each of the scenes, based on a similarity between the query vector and the video scene vector of each of the scenes;
in response to the obtained vector score of the at least one among the scenes being greater than a predetermined threshold, identifying that the video scene vector of the at least one among the scenes corresponds to the query vector; and
ranking the at least one among the scenes of which the video scene vector is identified to correspond to the query vector, based on the obtained vector score of the at least one among the scenes.

13. The method of claim 12, wherein the video scene vector of each of the scenes respectively have vector types comprising an action, an object and a caption, and
the method further comprises:
obtaining an amount of a part-of-speech included in the user query;
obtaining a vector type weight corresponding to one among the vector types, the vector type weight being obtained based on the obtained amount of the part-of-speech; and
applying the obtained vector type weight to at least one among the obtained vector score of each of the scenes, the at least one among the obtained vector score of each of the scenes corresponding to at least one among the video scene vector of each of the scenes having the one among the vector types.

14. The method of claim 8, wherein the splitting of the user query into the query subsets comprises:
identifying words of the user query that are tagged as nouns and verbs; and
obtaining the query subsets by pairing the identified words tagged as nouns and verbs.

15. A non-transitory computer-readable storage medium storing instructions configured to cause a processor to:
split a video into scenes;
obtain, from the scenes into which the video is split, one or more textual descriptors describing each of the scenes;
encode the obtained one or more textual descriptors describing each of the scenes into a video scene vector of each of the scenes;
encode a user query into a query vector having a same semantic representation as that of the video scene vector of each of the scenes into which the one or more textual descriptors describing each of the scenes are encoded;
identify whether the video scene vector of at least one among the scenes corresponds to the query vector into which the user query is encoded;
in response to the video scene vector of the at least one among the scenes being identified to correspond to the query vector, control to provide the at least one among the scenes;
in response to the video scene vector of each of the scenes being identified to not correspond to the query vector, split the user query into query subsets, each of the query subsets comprising a different part of the user query;
in response to the user query being split into the query subsets, encode the query subsets into query subset vectors, each of the query subset vectors having the same semantic representation as that of the video scene vector of each of the scenes;
identify whether the video scene vector of one or more of the scenes corresponds to at least one among the query subset vectors into which the query subsets are encoded; and
in response to the video scene vector of the one or more of the scenes being identified to correspond to the at least one among the query subset vectors, control to provide the one or more of the scenes.

16. The non-transitory computer-readable storage medium of claim 15, wherein the one or more textual descriptors describing each of the scenes are obtained from the scenes, by performing object detection, action recognition, object character recognition, pose detection and audio detection on the scenes, using deep neural networks.

17. The non-transitory computer-readable storage medium of claim 15, wherein the obtained one or more textual descriptors are encoded into the video scene vector of each of the scenes, using a Universal Sentence Encoder; and
the user query is encoded into the query vector, using the Universal Sentence Encoder.

18. The non-transitory computer-readable storage medium of claim 17, wherein the instructions are further configured to cause the processor to:
obtain captions from the video; and
encode the obtained captions and the obtained one or more textual descriptors describing each of the scenes into the video scene vector of each of the scenes, using the Universal Sentence Encoder.

19. The non-transitory computer-readable storage medium of claim 15, wherein the instructions are further configured to cause the processor to:
obtain a vector score of each of the scenes, based on a similarity between the query vector and the video scene vector of each of the scenes;
in response to the obtained vector score of the at least one among the scenes being greater than a predetermined threshold, identify that the video scene vector of the at least one among the scenes corresponds to the query vector; and
rank the at least one among the scenes of which the video scene vector is identified to correspond to the query vector, based on the obtained vector score of the at least one among the scenes.

20. The non-transitory computer-readable storage medium of claim 15, wherein the instructions are further configured to cause the processor to:
identify words of the user query that are tagged as nouns and verbs; and obtain the query subsets by pairing the identified words tagged as nouns and verbs.

\* \* \* \* \*